United States Patent
Alla

(10) Patent No.: US 11,768,994 B1
(45) Date of Patent: Sep. 26, 2023

(54) METHODS, SYSTEMS, AND COMPUTER READABLE MEDIUMS FOR GENERATING A CURATED USER INTERFACE (UI) MARKER

(71) Applicant: VCE Company, LLC, Richardson, TX (US)

(72) Inventor: Vijaya Vamsi Krishna Reddy Alla, Cary, NC (US)

(73) Assignee: EMC IP HOLDING COMPANY LLC, Round Rock, TX (US)

(*) Notice: Subject to any disclaimer, the term of this patent is extended or adjusted under 35 U.S.C. 154(b) by 1,315 days.

(21) Appl. No.: 14/572,281

(22) Filed: Dec. 16, 2014

(51) Int. Cl.
G06F 40/134 (2020.01)
H04L 67/10 (2022.01)
G06F 40/103 (2020.01)

(52) U.S. Cl.
CPC ............ *G06F 40/134* (2020.01); *G06F 40/103* (2020.01); *H04L 67/10* (2013.01)

(58) Field of Classification Search
CPC .................. G06F 17/24; G06F 17/2247; G06F 17/30905; G06F 17/3089; G06F 17/30873; G06F 17/30876; G06F 17/30884; G06F 17/30899; G06F 17/248; G06F 17/2235; G06F 17/30557; G06F 17/30887; G06Q 10/107; G06F 17/211; H04L 67/10; G06F 40/134; G06F 40/103
See application file for complete search history.

(56) References Cited

U.S. PATENT DOCUMENTS

| | | | | |
|---|---|---|---|---|
| 6,427,175 | B1* | 7/2002 | Khan et al. | G06F 17/30884 707/E17.114 |
| 6,460,038 | B1* | 10/2002 | Khan et al. | G06F 17/30884 |
| 6,990,433 | B1* | 1/2006 | McCutcheon | G06F 11/3428 324/512 |
| 7,665,082 | B2* | 2/2010 | Wyatt et al. | G06F 8/656 717/171 |
| 8,788,960 | B2* | 7/2014 | Dolan et al. | G06Q 10/10 715/771 |
| 8,903,997 | B2* | 12/2014 | Hobbs | H04L 41/08 709/219 |
| 9,395,883 | B1* | 7/2016 | Olsson et al. | G06Q 10/10 |
| 2001/0034739 | A1* | 10/2001 | Anecki et al. | G06Q 10/10 715/205 |
| 2002/0023122 | A1* | 2/2002 | Polizzi et al. | G06F 16/954 709/202 |
| 2002/0035584 | A1* | 3/2002 | Scheier et al. | G06F 21/604 715/205 |
| 2003/0120502 | A1* | 6/2003 | Robb et al. | G06Q 30/04 705/34 |
| 2005/0216421 | A1* | 9/2005 | Barry et al. | G06F 11/0709 705/64 |
| 2005/0223073 | A1* | 10/2005 | Malik | H04L 51/14 709/206 |
| 2006/0218639 | A1* | 9/2006 | Newman et al. | G06F 21/46 726/25 |

(Continued)

OTHER PUBLICATIONS

"Bookmark (World Wide Web)," Wikipedia, http://en.wikipedia.org/w/index.php?title=Bookmark_(World_Wide_Web)&oldid=627719879, pgs. 1-4 (Sep. 30, 2014).

*Primary Examiner* — Thu V Huynh
(74) *Attorney, Agent, or Firm* — Jenkins, Wilson, Taylor & Hunt, P.A.

(57) ABSTRACT

Methods, systems, and computer readable mediums for generating a curated user interface (UI) marker are disclosed. According to one exemplary embodiment, a method includes receiving information for generating a curated UI marker associated with a converged infrastructure management application, wherein the curated UI marker includes a hyperlink to locally stored information associated with the converged infrastructure management application. The method also includes generating, using the information, the curated UI marker associated with the converged infrastructure management application.

11 Claims, 4 Drawing Sheets

(56) References Cited

U.S. PATENT DOCUMENTS

| | | | | |
|---|---|---|---|---|
| 2007/0266080 | A1* | 11/2007 | McNicol et al. | G06Q 10/00 709/203 |
| 2008/0114847 | A1* | 5/2008 | Ma et al. | G06Q 50/184 709/206 |
| 2008/0126394 | A1* | 5/2008 | Jain et al. | G06Q 10/06311 |
| 2008/0278740 | A1* | 11/2008 | Bird et al. | G06Q 10/10 358/1.15 |
| 2009/0125829 | A1* | 5/2009 | Dalton et al. | G05B 19/41865 715/771 |
| 2011/0055705 | A1* | 3/2011 | Firminger et al. | G06Q 10/06 715/733 |
| 2011/0154356 | A1* | 6/2011 | Fareed | G06F 11/3423 718/105 |
| 2011/0197122 | A1* | 8/2011 | Chan et al. | G06F 17/248 715/234 |
| 2012/0042051 | A1* | 2/2012 | Muret et al. | C07K 14/705 709/219 |
| 2014/0032975 | A1* | 1/2014 | Chandran et al. | G06F 11/3636 714/47.1 |
| 2015/0234806 | A1* | 8/2015 | Bhagwan et al. | G06F 17/2765 705/7.18 |
| 2016/0062623 | A1* | 3/2016 | Howard et al. | G06F 3/04847 715/788 |
| 2016/0070676 | A1* | 3/2016 | Riemers et al. | G06F 3/1206 715/229 |
| 2016/0080224 | A1* | 3/2016 | Baikalov et al. | H04W 4/08 345/440 |

\* cited by examiner

METHODS, SYSTEMS, AND COMPUTER READABLE MEDIUMS FOR GENERATING A CURATED USER INTERFACE (UI) MARKER

TECHNICAL FIELD

The subject matter described herein relates to user interfaces. More specifically, the subject matter relates to methods, systems, and computer readable mediums for generating a curated user interface (UI) marker.

BACKGROUND

Management software may include user interfaces (UIs) or graphical UIs (GUIs) for managing, monitoring, viewing, and/or configuring one or more components (e.g., physical resources and/or virtual resources) within or associated with a computing system, e.g., a backend computing system separate from the management software. Such management software may include numerous menus, pages, and/or other UI elements for navigating and/or modifying information about various elements and/or their configurations. As such, user navigation and, more generally, usability associated with management software may be inefficient and cumbersome.

SUMMARY

Methods, systems, and computer readable mediums for generating a curated user interface (UI) marker are disclosed. According to one exemplary embodiment, a method includes receiving information for generating a curated UI marker associated with a converged infrastructure management application, wherein the curated UI marker includes a hyperlink to locally stored information associated with the converged infrastructure management application. The method also includes generating, using the information, the curated UI marker associated with the converged infrastructure management application.

BRIEF DESCRIPTION OF THE DRAWINGS

The subject matter described herein will now be explained with reference to the accompanying drawings of which.

DETAILED DESCRIPTION

Figure 1:
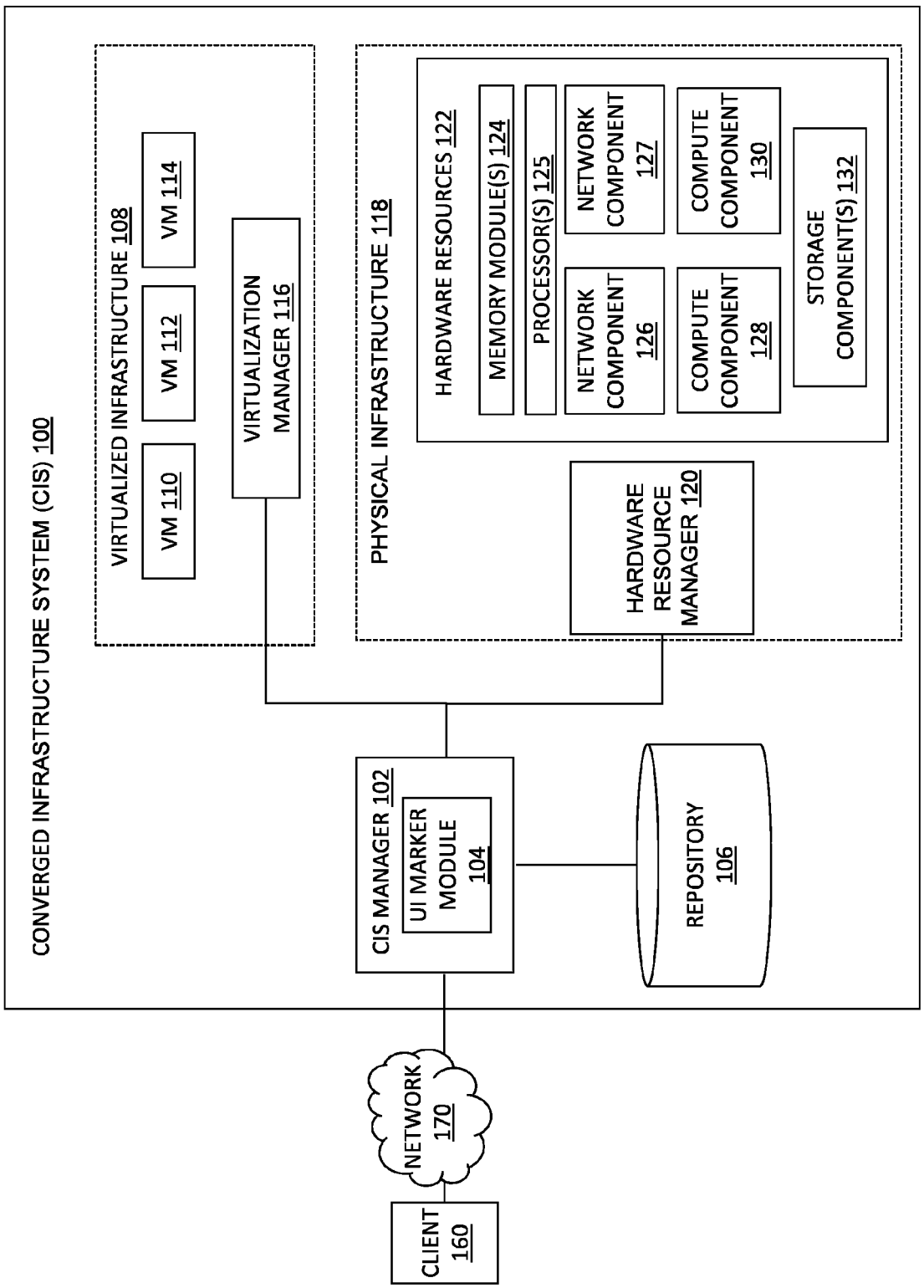
FIG. 1 is a diagram illustrating an exemplary converged infrastructure system according to an embodiment of the subject matter described herein.

The subject matter described herein includes methods, systems, and computer readable mediums for generating a curated user interface (UI) marker, e.g., any information suitable for identifying, retrieving, and/or providing UI content, a UI resource or element, a UI location, and/or related information, such as a UI view, a UI page, a report, search results, graphics, videos, multimedia files, or other information accessible via a UI. Conventional techniques for storing, retrieving, and displaying content are unsuitable for many purposes associated with a converged infrastructure management application. For example, some web browsers store images of pages visited, but are outdated when the pages change, e.g., when new articles or content is added to the website. In another example, a really simple syndication (RSS) feed may send a link to a user when an article or content is added to a website, but the updates are not user controlled. Further, conventional techniques involve sending a request for content to a content provider and receiving content from the content provider, e.g., a web server.

In accordance with some aspects of the disclosed subject matter, information for generating a curated UI marker associated with a converged infrastructure management application may be received, e.g., via a graphical UI (GUI) or other UI. In this example, the curated UI marker associated with the converged infrastructure management application may be generated using the received information and may be usable for providing previously accessed UI content quickly and efficiently, e.g., by selecting or activating the curated UI marker.

In accordance with some aspects of the disclosed subject matter, a converged infrastructure management application may interact with a converged infrastructure system (CIS) or an integrated infrastructure system (e.g., a Vblock™ System from VCE Company, LLC) and/or computing system components (CSCs) therein. For example, a CIS can comprise multiple CSCs, such as physical resources and/or virtual resources, in a preconfigured or prepackaged computing platform, where some CSCs are developed and/or manufactured by multiple entities. For example, an exemplary CIS can comprise data storage devices, servers, networking equipment, and software for managing physical resources and/or virtualized resources (e.g., virtual servers). Although the following disclosure describes the use of one or more CISs, any integrated infrastructure system or device may be utilized without departing from the scope of the present subject matter.

In accordance with some aspects of the disclosed subject matter, information associated with a curated UI marker may be stored locally. For example, a UI or a related application (e.g., a web browser) may store information (e.g., a UI view or related content) associated with a curated UI marker in a cache. In this example, when a user selects a curated UI marker that is locally stored, the stored information may be obtained and used to quickly and efficiently display a relevant UI view or related content, e.g., without requiring a request to be sent to a remote content provider and without waiting to receive information from the remote content provider.

In accordance with some aspects of the disclosed subject matter, information associated with a curated UI marker may be monitored and, if changes associated with the information are detected, a relevant entity may be notified. For example, if a curated UI marker references report information based on certain criteria, a computing platform and/or a module may monitor (e.g., periodically generate the marked report information) the report information to determine whether the report information has changed. In this example, if the report information has changed, a computing platform and/or a module may notify the user or a related entity.

Reference will now be made in detail to exemplary embodiments of the subject matter described herein, examples of which are illustrated in the accompanying drawings. Wherever possible, the same reference numbers will be used throughout the drawings to refer to the same or like parts.

FIG. 1 is a block diagram illustrating an exemplary CIS 100 according to an embodiment of the subject matter described herein. Although the following disclosure describes the use of CIS 100, any type of computer system may be utilized without departing from the scope of the present subject matter. CIS 100 can comprise CSCs, such as virtual resources and physical resources. Exemplary physical resources can comprise a processor, a memory module, a compute component, a network component, a storage component, a server, network equipment, a router, a switch, wiring or cabling, a storage device, a physical port, and/or a communications interface. Exemplary virtual resources can comprise a virtual entity (e.g., an entity that appears as a physical entity but comprises one or more components associated with one or more CISs), a virtual machine, a virtual server, a virtual storage device, a virtual port, and/or a virtual communications interface. CIS 100 may also comprise software and related components for managing the CIS and/or portions (e.g., CSCs) therein.

In some embodiments, CIS 100 may be configured to provide web service functionality, cloud service functionality, and/or other functionality. CIS 100 may be capable of communicating with other CISs (e.g., located at various physical locations or sites) and may communicate with various other entities, such as network nodes (e.g., servers hosting online sites) and users. For example, client 160 may represent any entity (e.g., software executing on a processor, a web-based interface, etc.) for allowing a user (e.g., a human operator or an automated system) to interact with CIS 100, CSCs therein, and/or other entities. In some embodiments, client 160 may communicate directly with CIS 100 with or without using network 170.

In some embodiments, CIS 100 can comprise a CIS manager 102 (e.g., a CIS management module), a repository 106, virtualized infrastructure 108, and/or physical infrastructure 118. CIS manager 102 may be any suitable entity for managing aspects of CIS 100 or portions therein (e.g., CSCs or groups of CSCs). CIS manager 102 may be configured to communicate with various CSCs and/or for managing various CSCs. For example, CIS manager 102 can be configured to access each CSC within CIS 100 and return relevant information to client 160. For example, CIS manager 102 may be configured to manage performance, resource utilization levels, and other aspects associated with virtualized infrastructure 108 and/or physical infrastructure 118. In some embodiments, CIS manager 102 can comprise VCE Vision™ Intelligent Operations software and/or firmware.

In some embodiments, CIS manager 102 may include a converged infrastructure management application for interacting with CIS 100 and/or CSCs therein. In such embodiments, the converged infrastructure management application may include or provide an API, a GUI, and/or another UI. For example, a converged infrastructure management application may provide a web-based GUI containing various UI elements (e.g., pages, frames, charts, tables, text, videos, audio, buttons, menus, icons, etc.), where the UI elements are referenced using identifiers, such as uniform resource identifiers (URIs), uniform resource locators (URLs), and/or uniform resource names (URNs). In this example, identifiers may be stored and used in curated UI markers (e.g., as hyperlinks) such that a user can easily and quickly navigate to the marked UI elements and/or locations in the converged infrastructure management application.

CIS manager 102 can comprise or interact with a curated UI marker module 104. Curated UI marker module 104 can be any suitable entity (e.g., software executing on a processor) for performing one or more aspects associated with curated UI marker generation, curated UI marker monitoring, curated UI marker sharing, and/or related actions. For example, curated UI marker module 104 may be configured to generate a curated UI marker including a hyperlink referencing a current UI element, such as a page or a view in a converged infrastructure management application. In this example, a user may select the hyperlink to navigate to the marked location, thereby improving usability and eliminating multi-click navigation. In another example, curated UI marker module 104 may be configured to share a curated UI marker with different users of a converged infrastructure management application. In yet another example, curated UI marker module 104 may be configured to monitor curated UI marker related information and notify an entity regarding any changes, e.g., when a compliance report is marked and new or different results are generated.

In some embodiments, curated UI marker module 104 can include one or more communications interfaces for communicating with various entities, such as client 160, CIS 100, and/or one or more CSCs. Exemplary communications interfaces may receive or send messages associated with various protocols or formats. For example, curated UI marker module 104 may send Internet protocol (IP) packets including hypertext markup language (HTML) and/or extensible markup language (XML) payloads. In another example, curated UI marker module 104 may generate and send messages including one or more programming languages, such as HTML and/or Apache Flex®, usable for displaying a GUI and/or UI elements. In this example, the programming languages may be usable to generate and/or display a UI element representing a hyperlink associated with a curated UI marker.

In some embodiments, curated UI marker module 104 can include functionality for receiving and/or providing curated UI marker related information via an API, a GUI, or other interface. For example, client 160 may request, using a representation state transfer (REST) API related message, a curated UI marker for a page, a view, and/or other UI elements associated with a converged infrastructure management application. In this example, curated UI marker module 104 may provide, using a REST API related message, curated UI marker related information associated with the converged infrastructure management application. In another example, curated UI marker related information may be received from a file (e.g., an XML file) or via interaction with another application.

In some embodiments, curated UI marker module 104 can include functionality for generating curated UI markers and/or hyperlinks using URIs, URLs, and/or URNs. For example, curated UI marker module 104 can generate a hyperlink using one or more URIs for referencing and/or displaying one or more UI elements in a converged infrastructure management application or a related GUI.

In some embodiments, curated UI marker module 104 can include functionality for editing, deleting, and/or adding curated UI markers and/or hyperlinks via a GUI, an API, or other UI. For example, a user may create, edit, and/or delete one or more curated UI markers via an API and/or using a scripting language. In this example, the user may create, edit, and/or delete curated UI markers without logging in, e.g., via a GUI, to a converged infrastructure management application. In another example, a user may edit, add, delete, and/or share curated UI markers via a GUI, e.g., by selecting appropriate buttons or other UI elements in the GUI.

In some embodiments, curated UI marker module 104 can include functionality for sharing a curated UI marker with one or more users, e.g., for troubleshooting, collaborating, and/or other purposes. For example, a first user may trigger curated UI marker module 104 to generate a curated UI marker for a specific page or report associated with CIS 100. In this example, the first user may mark the curated UI marker as "public" by placing the curated UI marker in a quick navigation wizard, e.g., a public folder accessible by one or more users or user groups. Continuing with this example, instead of downloading the report and emailing the report to a second user, the second user may view and/or use the curated UI marker in the quick navigation wizard.

In some embodiments, curated UI marker module 104 can include functionality for monitoring curated UI marker related information. For example, a user may trigger curated UI marker module 104 to generate a curated UI marker for a compliance report. In this example, the compliance report may involve analyzing CSCs based on user-defined criteria and may generate hundreds of results. Continuing with the example, curated UI marker module 104 may monitor the results associated with the curated UI marker to determine whether the results change and, if the results change, curated UI marker module 104 may notify the user or a related entity.

In some embodiments, monitoring curated UI marker related information may include storing marked dynamic content (e.g., compliance reports or search results) along with user-defined criteria or configuration information associated with the marked dynamic content. In such embodiments, curated UI marker module 104 may periodically generate new content based on the stored information and may compare the new content and the original content. If the content changes, curated UI marker module 104 may notify relevant entities, such as a user and/or client 160.

In some embodiments, curated UI markers and/or curated UI marker related information can be stored in a cache or memory local to client 160. For example, after triggering curated UI marker generation and/or utilizing a generated curated UI marker, client 160 or a related entity may store information associated with the curated UI marker such that the user can navigate to the marked location without requesting and receiving content from a remote and/or original content provider (e.g., CIS manager 102). By storing information locally, rendering performance associated with a converged infrastructure management application and/or a related GUI may be significantly improved.

In some embodiments, client 160, CIS manager 102 and/or other modules or nodes may include functionality for receiving an indication indicating that curated UI marker related information has changed and may perform various actions. For example, where client 160 or a related application (e.g., a web browser) stores information associated with a curated UI marker in a local memory, client 160 or a related application may delete the information from the cache in response to receiving an indication indicating that curated UI marker related information has changed. In another example, client 160 or a related application may request, receive, or obtain change information associated with a curated UI marker in response to receiving to an indication indicating that curated UI marker related information has changed.

In some embodiments, curated UI markers and/or curated UI marker related information can be stored in repository 106. Repository 106 can include any data storage unit (e.g., a database or plurality of databases) that may be configured to store curated UI marker related information, such as hyperlinks and related URIs, URLs, and/or URNs. Although FIG. 1 depicts repository 106 as a local data storage unit residing on CIS 100, repository 106 can also be embodied as a data storage unit located at an online location (e.g., a public distributed content site), on a local proxy server in a customer's or system administrator's environment, or on a different CIS without departing from the scope of the disclosed subject matter. Further, repository 106 may be implemented using one or more computing platforms, devices, or systems.

In some embodiments, repository 106 can be provisioned with curated UI marker related information from a second repository (e.g., from a second CIS or from an online location, such as a known, online site that may be hosted by the CIS manufacturer). For example, curated UI marker related information may be obtained or copied from a second repository (e.g., a second CIS, an online site, online repository, or any other online location) over network 170, using secure copy (SCP) protocol, file transfer protocol (FTP), secure file transfer protocol (SFTP), hypertext transfer protocol (HTTP), or any like protocol. In some embodiments, CIS 100 and a second CIS may be located at a common site and can be communicatively connected by a wired connection. In such a configuration, repository 106 may be provisioned with curated UI marker related information from the second CIS via the wired connection. It is understood that the provisioning of repository 106 with curated UI marker related information using the exemplary methods described above may be conducted via any automated or automatic manner. In addition, curated UI marker related information copied from a second repository and installed into repository 106 may utilize any form of transportable mediums, such as a compact disc (CD), flash memory, a universal serial bus (USB) device, and the like.

Virtualized infrastructure 108 can comprise a virtualization environment configured to simulate components of a computing device, such as a processor, system memory, and a storage device, for executing one or more virtual machines (VMs) (e.g., VM 110, VM 112, and VM 114). Each of VM 110, VM 112, and VM 114 may be configured to perform various functions and/or services, such as web server functions or cloud application services, and may interact with various nodes, components, and/or users.

In some embodiments, virtualized infrastructure 108 can be associated with one or more virtual entities. Each virtual entity can comprise one or more CIS or portions therein, e.g., CSCs from one or more CISs. In some embodiments, virtualization manager 116 may allow logical entities to be created, deleted, or modified using an API and/or a GUI. Virtualization manager 116 may be any suitable entity (e.g., software executing in a virtual machine) for managing aspects associated with virtualized infrastructure 108. In some embodiments, virtualization manager 116 may be configured for providing data management via one or more communications interfaces. For example, virtualization manager 116 may communicate with one or more third-party management tools using APIs.

Physical infrastructure 118 can comprise hardware resources 122, such as memory module(s) 124, processor(s) 125, network components 126-127, compute components 128-130, and one or more storage component(s) 132. Hardware resources 122 may be communicatively connected to various other CSCs in CIS 100 and other entities. Hardware resources 122 can be configured for use by one or more virtual entities. In some embodiments, network components 126-127 (e.g., network switches) may be configured to enable communication between the components in CIS 100. In some embodiments, one or more file share storage (FSS) systems (not shown) can be utilized to provide file system level access to a CIS across a local area network (LAN).

Hardware resource manager 120 can be any suitable entity (e.g., software executing in a virtual machine) for managing aspects associated with physical infrastructure 118. In some embodiments, hardware resource manager 120 may be configured to provision hardware resources 122 via one or more communications interfaces. For example, hardware resource manager 120 may provision hardware resources 122 for implementing one or more virtual entities in virtualized infrastructure 108. In some embodiments, hardware resource manager 120 may comprise any management component or entity, such as a unified infrastructure manager (UIM) or a unified computing system (UCS) director entity, which is configured to provision the physical hardware of CIS 100.

In some embodiments, processor(s) 125 can include a microprocessor (e.g., a trusted platform module (TPM) using trusted execution technology (TXT)), central processing unit (CPU), or any other like hardware based processing unit. In some embodiments, some aspects of the disclosed subject matter can be stored in memory module(s) 124, which can include random access memory (RAM), read only memory (ROM), optical read/write memory, cache memory, magnetic read/write memory, flash memory, or any other non-transitory computer readable medium. In some embodiments, processor(s) 125 and memory module(s) 124 can be used to execute, implement, and/or manage the operation of aspects of the disclosed subject matter. In some embodiments, storage component(s) 132 can include any storage medium or storage unit that is configured to store information accessible by processor(s) 125 via a system bus. In some embodiments, repository 106 or portions thereof may utilize storage component(s) 132 and/or memory module(s) 124. In some embodiments, repository 106 and/or storage component(s) 132 can include or utilize one or more storage area networks.

As indicated above, the subject matter disclosed herein can be implemented in software in combination with hardware and/or firmware. For example, subject matter described herein can be implemented in software executed by a processor. In some exemplary implementations, the subject matter described herein can be implemented using a computer readable medium having stored thereon computer executable instructions, which when executed by a processor of a computer, cause the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms. For example, a curated UI marker module 104 or repository 106 (e.g., a system library or data therein) may be located at a single computing system or may be distributed across one or more devices, platforms, and/or systems. As used in the disclosed subject matter, the terms "function" or "module" refer to hardware, firmware, or software in combination with hardware and/or firmware for implementing features described herein.

In some embodiments, various entities depicted in FIG. 1 may be incorporated or implemented using one or more other entities depicted in FIG. 1. For example, memory module(s) 124 and/or processor(s) 125 may be incorporated in compute component 128, compute component 130, and/or a specialized device or compute component (e.g., an application management pod (AMP)). In another example, CIS manager 102 may be implemented using or located in an AMP and/or another device in physical infrastructure 118. In yet another example, virtualization software and/or virtualized components may be implemented using an AMP and/or another compute device (e.g., a blade appliance designated for some system management software).

It will be appreciated that FIG. 1 is for illustrative purposes and that various components, their locations, and/or their functions as described above in relation to FIG. 1 may be changed, altered, added, or removed. Further, aspects of the disclosed subject matter (e.g., curated UI marker module 104) may be implemented and/or located on any computing system or components therein.

Figure 2:
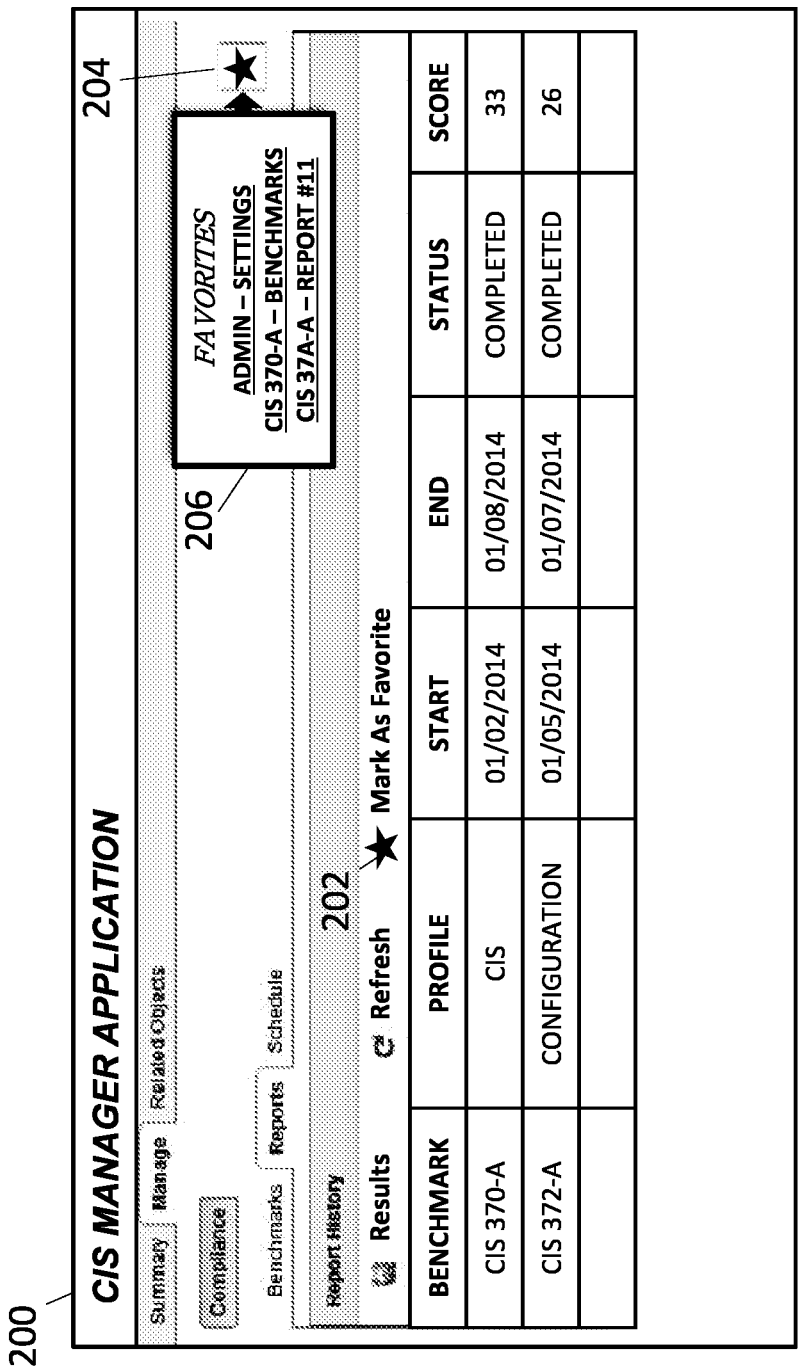
FIG. 2 is a diagram illustrating an exemplary user interface (UI) for providing a curated UI marker related information according to an embodiment of the subject matter described herein.

FIG. 2 is a diagram illustrating an exemplary UI 200 for providing a curated UI marker related information according to an embodiment of the subject matter described herein. In some embodiments, curated UI marker module 104, CIS manager 102, a converged infrastructure management application, and/or an associated module or node may generate and/or provide UI 200 for providing, receiving, and/or displaying information, including curated UI marker related information. In some embodiments, UI 200 may be presented to a user via a web browser executing on a processor at client 160.

Referring to FIG. 2, UI 200 may represent any suitable UI element container or UI window for displaying or providing UI elements, UI element containers, and/or content to a user. In some embodiments, UI 200 may include UI elements for selecting settings and/or options associated with one or more CSCs. For example, UI 200 may provide a configuration page containing UI elements (e.g., a text input box, an option box, and/or a drop down menu box) for allowing a user to input configuration information and/or for performing other modifications associated with a CSC.

In some embodiments, UI 200 may include UI elements for providing search criteria, report criteria, and/or for searching for relevant information. For example, a user may utilize UI 200 for identifying a subset of CSCs in CIS 100 based on one or more user-defined and/or predefined criteria, e.g., manufacturer, type, availability, location, and/or other criteria. In another example, a user may utilize UI 200 for generating a compliance report based on one or more user-defined and/or predefined criteria.

UI 200 may include a curated UI marker button 202, a curated UI marker list button 204, and a curated UI marker list 206. Curated UI marker button 202 may represent any suitable UI element for triggering curated UI marker generation. For example, a user may select curated UI marker button 202 (e.g., labeled as "Mark As Favorite" in FIG. 2) associated with a compliance report. In this example, after selecting curated UI marker button 202, information for generating a curated UI marker, such as a current URI and/or related information (e.g., compliance report criteria) may be sent to curated UI marker module 104 for generating a curated UI marker.

In some embodiments, curated UI marker button 202 may include or trigger UI elements for gathering curated UI marker related information. For example, a user may select curated UI marker button 202 and a UI window may appear for allowing the user to input curated UI marker related information, such as a curated UI marker identifier (e.g., a user-defined curated UI marker name) and/or a URI for referencing an UI element to be marked. Continuing with the example, after inputting the curated UI marker related information, the information may be provided to curated UI marker module 104 and curated UI marker module 104 may generate a curated UI marker using the information.

Curated UI marker list button 204 may represent any suitable UI element for triggering a list of curated UI markers or curated UI marker related information. For example, a user may select curated UI marker list button 204 in UI 200. In this example, after selecting curated UI marker list button 204, curated UI marker list 206 (e.g., UI window) may appear for allowing the user to select, edit, add, delete, and/or view one or more curated UI markers or curated UI marker related information.

Curated UI marker list 206 may represent any suitable UI element for displaying one or more curated UI markers or curated UI marker related information. For example, curated UI marker list 206 may be displayed in response to a user selecting curated UI marker list button 204. In this example, curated UI marker identifiers may be displayed in curated UI marker list 206. Continuing with the example, if a user selects one of the identifiers in curated UI marker list 206, a curated UI marker represented by the selected curated UI marker identifier may be utilized and/or modified.

In some embodiments, curated UI marker list 206 may include or trigger UI elements for selecting, sharing, editing, adding, and/or deleting curated UI markers or curated UI marker related information. For example, a user may select a curated UI marker identifier from curated UI marker list 206 and a UI window may appear including UI elements for editing or deleting the related curated UI marker. In another example, curated UI marker list 206 may include an add curated UI marker button for adding a new curated UI marker and a share curated UI marker button for sharing a curated UI marker with another user.

In some embodiments, curated UI markers or curated UI marker related information in curated UI marker list 206 may be sorted based on one or more factors. For example, curated UI marker identifiers in curated UI marker list 206 may be listed alphabetically, temporally (e.g., by a creation date), and/or usage (e.g., curated UI markers may be listed from most frequently selected to least frequently selected).

In some embodiments, selecting a curated UI marker identifier may include triggering an associated hyperlink and displaying a page, a view, and/or other UI elements associated with the hyperlink.

In some embodiments, curated UI marker list 206 may include one or more default or predefined curated UI markers or curated UI marker related information (e.g., curated UI marker identifiers) that may be set at manufacturing and/or an initial deployment.

It will be appreciated that FIG. 2 is for illustrative purposes and that additional and/or different UI elements may be usable for providing, receiving, and/or displaying curated UI marker related information other than those depicted in FIG. 2.

Figure 3:
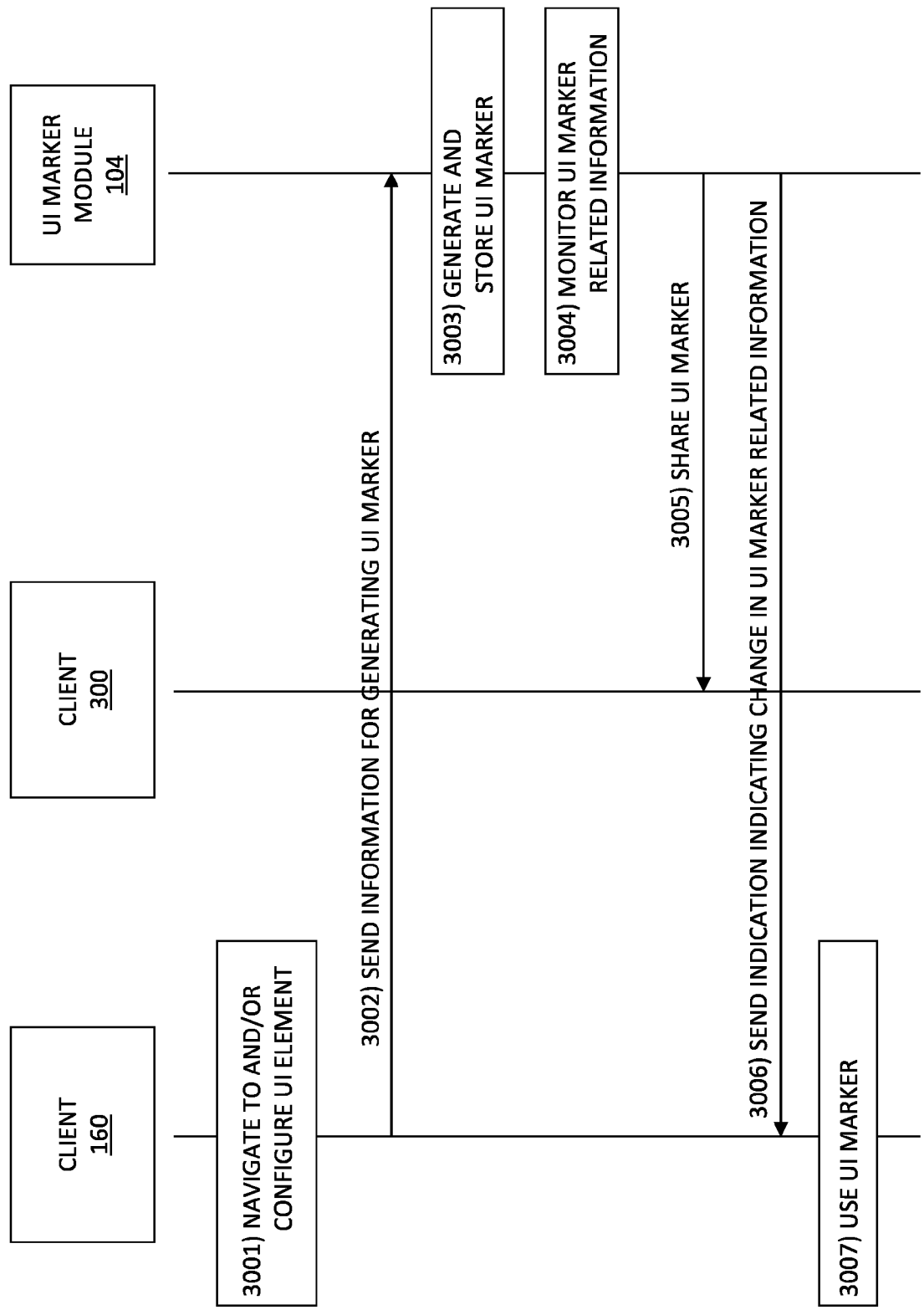
FIG. 3 is a diagram illustrating an exemplary curated UI marker generation and notification procedure according to an embodiment of the subject matter described herein.

FIG. 3 is a diagram illustrating an exemplary curated UI marker generation and notification procedure according to an embodiment of the subject matter described herein. In some embodiments, curated UI marker module 104 may be integrated with and/or may be located at CIS manager 102, e.g., server-side software executing on a processor at CIS 100. In some embodiments, curated UI marker module 104 may be integrated with and/or may be located at client 160, e.g., client-side software executing on a processor at client 160.

Referring to FIG. 3, at step 3001, client 160 may navigate to and/or configure a UI element. For example, client may navigate to a UI element (e.g., a page or a frame) in a GUI associated with a converged infrastructure management application.

In some embodiments, a converged infrastructure management application may utilize URIs and/or other information for uniquely identifying UI elements or content therein, e.g., that can be navigated to or otherwise accessed via a UI.

At step 3002, information for generating a curated UI marker may be sent from client 160 to curated UI marker module 104. For example, a curated UI marker request message may include a URI and/or other information for generating a curated UI marker, e.g., such that a current page or content displayed therein can be referenced or linked.

At step 3003, the curated UI marker may be generated and stored. For example, curated UI marker module 104 may generate and store a curated UI marker in repository 106 and/or at a local cache (e.g., a web browser cache) associated with client 160. In this example, curated UI marker module 104 may also generate and send a curated UI marker response message containing a related hyperlink to client 160.

At step 3004, curated UI marker related information may be monitored. For example, curated UI marker module 104 may periodically or aperiodically (e.g., dynamically) determine whether the information referenced by a curated UI marker has changed since the curated UI marker has been generated. In this example, information referenced by a curated UI marker may change if the curated UI marker references dynamic information, such as state information about a CSC or a compliance report.

At step 3005, the curated UI marker may be shared with client 300. For example, curated UI marker module 104 may store a curated UI marker in repository 106. In this example, client 300 may have access to all or some curated UI markers stored in repository 106. In another example, client 160 may allow curated UI marker module 104 to share a curated UI marker with client 300, e.g., in response to a curated UI marker share request by client 300.

At step 3006, an indication indicating change associated with the curated UI marker related information may be sent from curated UI marker module 104 to client 160. For example, curated UI marker module 104 may detect curated UI marker related information has changed, e.g., a URI associated with a curated UI marker references different information and/or a different UI element. In this example, in response to detecting the change, curated UI marker module 104 may notify client 160 and/or other entities.

In some embodiments, in response to detecting a change associated with curated UI marker related information, curated UI marker module 104 may notify all clients that access or use the affected curated UI marker, e.g., client 160 and client 300.

In some embodiments, in response to being notified about a change associated with curated UI marker related information, client 160 may clear curated UI marker related information stored in a local cache and/or refresh the local cache with the changed information.

At step 3007, a curated UI marker may be used. For example, client 160 may select a curated UI marker, thereby triggering a UI to display a UI element or content therein without require additional UI navigation clicks. In another example, client 300 may modify a shared curated UI marker via a UI such that the modified curated UI marker references a UI element and/or content therein different from the original curated UI marker. In yet another example, client 160 may delete a curated UI marker and/or modify sharing permissions associated with the curated UI marker to prevent client 300 from using or modifying the curated UI marker.

It will be appreciated that FIG. 3 is for illustrative purposes and that additional and/or different steps than those depicted in FIG. 3 may be usable for generating a curated UI marker, monitoring curated UI marker related information, sharing the curated UI marker, and/or notifying entities about changes associated with monitoring curated UI marker related information. Additionally, it will be appreciated that steps depicted in FIG. 3 may occur in a different order than depicted. For example, step 3005 may occur prior to or concurrently with step 3004.

Figure 4:
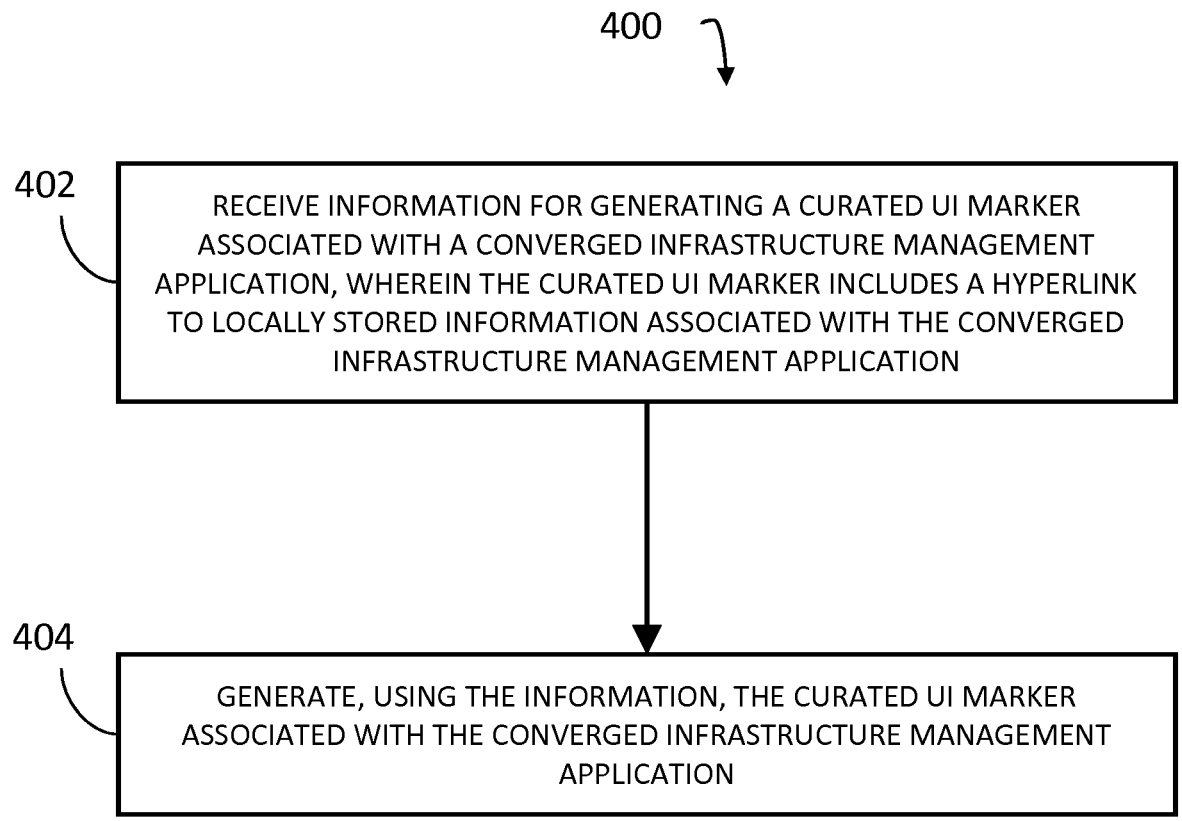
FIG. 4 is a diagram illustrating an exemplary method for generating a curated UI marker according to an embodiment of the subject matter described herein.

FIG. 4 is a diagram illustrating an exemplary method 400 for generating a curated UI marker according to an embodiment of the subject matter described herein. In some embodiments, exemplary method 400 and/or steps therein may be performed by CIS 100, curated UI marker module 104, and/or another node or module. For illustrative purposes and explanation, references to entities included in FIGS. 1-3 may be used below.

At step 402, information for generating a curated UI marker associated with a converged infrastructure management application is received via a UI, wherein the curated UI marker includes a hyperlink to locally stored information associated with the converged infrastructure management application. For example, curated UI marker button 202 may be selected by client 160. In this example, after selecting curated UI marker button 202, curated UI marker related information, such as a URI representing the current page, and/or other information, such as search criteria for generating a search report, may be sent to curated UI marker module 104.

At step 404, the curated UI marker associated with the converged infrastructure management application is generated using the information. For example, after receiving information (e.g., a URI) via a UI, curated UI marker module 104 may generate a curated UI marker usable for navigating to a UI element or related information. For example, a curated UI marker may include a hyperlink (e.g., a pointer or URI) that references a UI element with a particular configuration. In this example, the hyperlink may point to a stored copy of the content or information, e.g., at repository 106.

In some embodiments, utilizing a curated UI marker may include displaying content stored in a local memory associated with a client device. For example, client 160 may store a content associated with a curated UI marker in a local memory or cache. In this example, instead of sending a HTTP request or other message for requesting content to a content provider when the curated UI marker is selected, client 160 may be configured to use the stored content in the local memory or cache.

In some embodiments, a UI element may include at least one member selected from a group consisting of a report, a view, a frame, a page, a graphic, text, a video, an audio element, and/or a multimedia element.

In some embodiments, information associated with a curated UI marker may be monitored for changes. For example, a curated UI marker may reference a page of information that can change (e.g., search results based on current operational statistics). In such embodiments, if changes are detected, an indication that information associated with the curated UI marker has changed may be provided via the UI, e.g., to client 160.

In some embodiments, a curated UI marker may be shared with another user of a converged infrastructure management application. For example, curated UI marker module 104 may generate a curated UI marker associated with client 160. In this example, client 300 may view, request, receive, and/or use the curated UI marker.

In some embodiments, a curated UI marker may be modifiable via a UI. For example, after generating a curated UI marker, the curated UI marker may be edited, deleted, and/or modified via a UI, such as a GUI or an API, by client 160 or client 300.

In some embodiments, a converged infrastructure management application may interact with at least one member selected from a group consisting of CIS 100, a computing platform, a computing device, a virtual machine, a hypervisor, a compute component, a network component, a storage component, software, an operating system, firmware, hardware, a physical resource, and/or a virtual resource.

It should be noted that curated UI marker module 104 and/or functionality described herein may constitute a special purpose computing system. Further, curated UI marker module 104 and/or functionality described herein can improve the technological field of UI navigation and UI related usability by generating curated UI markers, storing curated UI marker related information locally, and/or by monitoring curated UI marker related information and providing indications about changes to curated UI marker related information.

The subject matter described herein for generating a curated UI marker and/or other curated UI marker related actions improve the functionality of UI navigation and UIs in general by providing for more efficient user interactions (e.g., a user is able to curated UI marker a configuration page and may return to the configuration page quickly without multiple menu selections or button clicks). It should also be noted that a computing platform that implements the subject matter described herein may comprise a special purpose computing device usable to generate curated UI markers, to store curated UI marker related information locally, to monitor curated UI marker related information, and/or to provide indications about changes to curated UI marker related information.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for generating a curated user interface (UI) marker, the method comprising:

receiving information for generating a curated UI marker associated with a converged infrastructure management application managing a converged infrastructure system containing computing system components, wherein the information for generating the curated UI marker includes user-defined criteria for displaying benchmark information associated with the computing system components in the converged infrastructure management application in a particular configuration, wherein the information for generating the curated UI marker includes permission information for indicating that the curated UI marker is available for use by multiple users;

generating, using the information for generating the curated UI marker, the curated UI marker associated with the converged infrastructure management application;

sending the curated UI marker to client devices of the multiple users, wherein the curated UI marker includes the benchmark information associated with the computing system components, wherein each of the client devices stores, in a web browser cache or a local memory, the benchmark information associated with the computing system components, wherein the curated UI marker includes a hyperlink that is displayed in a web-based graphical UI (GUI) via a web browser executing at each of the client devices, wherein the hyperlink references a UI element with the particular configuration and that displays the stored benchmark information associated with the computing system components, wherein the curated UI marker is modifiable by at least one of the client devices;

monitoring the computing system components for changes that affect the veracity of the stored benchmark information associated with the computing system components, wherein the curated UI marker is modifiable by at least one of the client devices;

providing, to each of the client devices, an indication that the stored benchmark information associated with the computing system components has changed;

receiving, from a first client device of the client devices, a request to receive updated information associated with the computing system components; and providing, to the first client device, the updated information associated with the computing system components, wherein the updated information is stored at the first client device and wherein the first client device displays the updated information in the particular configuration when the hyperlink is selected.

2. The method of claim 1 wherein the UI element includes at least one member selected from a group consisting of a report, a view, a frame, a page, a graphic, text, a video, an audio element, and a multimedia element.

3. The method of claim 1 wherein the curated UI marker or a related identifier is displayed in a list of available curated UI markers or related identifiers in the web-based GUI via the web browser executing at the first client device.

4. The method of claim 1 wherein the converged infrastructure management application interacts with at least one member selected from a group consisting of a converged infrastructure system (CIS), a computing platform, a computing device, a virtual machine, a hypervisor, a compute component, a network component, a storage component, software, an operating system, firmware, hardware, a physical resource, and a virtual resource.

5. A system for generating a curated user interface (UI) marker, the system comprising:
 a processor; and
 a curated UI marker module implemented using the processor, wherein the curated UI marker module is configured to receive information for generating a curated UI marker associated with a converged infrastructure management application managing a converged infrastructure system containing computing system components, wherein the information for generating the curated UI marker includes user-defined criteria for displaying benchmark information associated with the computing system components in the converged infrastructure management application in a particular configuration, wherein the information for generating the curated UI marker includes permission information for indicating that the curated UI marker is available for use by multiple users, to generate, using the information for generating the curated UI marker, the curated UI marker associated with the converged infrastructure management application, to send the curated UI marker to client devices of the multiple users, wherein the curated UI marker includes the benchmark information associated with the computing system components, wherein each of the client devices stores, in a web browser cache at or a local memory, the benchmark information associated with the computing system components, wherein the curated UI marker includes a hyperlink that is displayed in a web-based graphical UI (GUI) via a web browser executing at the client device, wherein the hyperlink references a UI element with the particular configuration and that displays the stored benchmark information associated with the computing system components, wherein the curated UI marker is modifiable by at least one of the client devices to monitor the computing system components for changes that affect the veracity of the stored benchmark information associated with the computing system components, to provide, to each of the client devices, an indication that the stored benchmark information associated with the computing system components has changed; receiving, from a first client device of the client devices, a request to receive updated information associated with the computing system components; and providing, to the first client device, the updated information associated with the computing system components, wherein the updated information is stored at the first client device and wherein the first client device displays the updated information in the particular configuration when the hyperlink is selected.

6. The system of claim 5 wherein the UI element includes at least one member selected from a group consisting of a report, a view, a frame, a page, a graphic, text, a video, an audio element, and a multimedia element.

7. The system of claim 5 wherein the curated UI marker or a related identifier is displayed in a list of available curated UI markers or related identifiers in the web-based GUI via the web browser executing at the first client device.

8. The system of claim 5 wherein the converged infrastructure management application interacts with at least one member selected from a group consisting of a converged infrastructure system (CIS), a computing platform, a computing device, a virtual machine, a hypervisor, a compute component, a network component, a storage component, software, an operating system, firmware, hardware, a physical resource, and a virtual resource.

9. A non-transitory computer readable medium having stored thereon executable instructions which, when executed by a processor of a computer, cause the computer to perform steps comprising:
 receiving information for generating a curated user interface (UI) marker associated with a converged infrastructure management application managing a converged infrastructure system containing computing system components, wherein the information for generating the curated UI marker includes user-defined criteria for displaying benchmark information associated with the computing system components in the converged infrastructure management application in a particular configuration, wherein the information for generating the curated UI marker includes permission information for indicating that the curated UI marker is available for use by multiple users;
 generating, using the information for generating the curated UI marker, the curated UI marker associated with the converged infrastructure management application;
 sending the curated UI marker to client devices of the multiple users, wherein the curated UI marker includes the benchmark information associated with the computing system components, wherein each of the client devices stores, in a web browser cache or a local memory, the benchmark information associated with the computing system components, wherein the curated UI marker includes a hyperlink that is displayed in a web-based graphical UI (GUI) via a web browser executing at each of the client devices, wherein the hyperlink references a UI element with the particular configuration and that displays the stored benchmark information associated with the computing system components, wherein the curated UI marker is modifiable by at least one of the client devices;

monitoring the computing system components for changes that affect the veracity of the stored benchmark information associated with the computing system components wherein the curated UI marker is modifiable by at least one of the client devices;

providing, to each of the client devices, an indication that the stored benchmark information associated with the computing system components has changed;

receiving, from a first client device of the client devices, a request to receive updated information associated with the computing system components; and providing, to the first client device, the updated information associated with the computing system components, wherein the updated information is stored at the first client device and wherein the first client device displays the updated information in the particular configuration when the hyperlink is selected.

10. The non-transitory computer readable medium of claim 9 wherein the UI element includes at least one member selected from a group consisting of a report, a view, a frame, a page, a graphic, text, a video, an audio element, and a multimedia element.

11. The non-transitory computer readable medium of claim 9 wherein the curated UI marker or a related identifier is displayed in a list of available curated UI markers or related identifiers in the web-based GUI via the web browser executing at the first client device.

* * * * *